US006334988B1

United States Patent
Gallis et al.

(12)

(10) Patent No.: US 6,334,988 B1
(45) Date of Patent: Jan. 1, 2002

(54) MESOPOROUS SILICATES AND METHOD OF MAKING SAME

(75) Inventors: Karl W. Gallis, South Burlington; Christopher C. Landry, Burlington, both of VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 0 days.

(21) Appl. No.: 09/378,073

(22) Filed: Aug. 20, 1999

Related U.S. Application Data

(60) Provisional application No. 60/097,408, filed on Aug. 21, 1998.

(51) Int. Cl.$^7$ ............... C01B 33/26; C01B 32/20; C01B 33/12

(52) U.S. Cl. ............... 423/326; 423/338; 423/328.1; 423/328.2

(58) Field of Search .................. 423/335, 338, 423/326, 327.1, 328.1, 328.2

(56) References Cited

U.S. PATENT DOCUMENTS

| | | | |
|---|---|---|---|
| 4,554,211 A | 11/1985 | Arika et al. | 428/402 |
| 5,068,216 A | 11/1991 | Johnson et al. | 502/241 |
| 5,112,589 A | 5/1992 | Johnson et al. | 423/328 |
| 5,156,828 A | 10/1992 | Degnan et al. | 423/709 |
| 5,220,101 A | 6/1993 | Beck et al. | 585/824 |
| 5,264,197 A * | 11/1993 | Wang et al. | 423/338 |
| 5,308,602 A | 5/1994 | Calabro et al. | 423/705 |
| 5,378,440 A | 1/1995 | Herbst et al. | 423/210 |
| 5,840,264 A | 11/1998 | Pinnavaia et al. | 423/277 |
| 5,858,457 A | 1/1999 | Brinker et al. | 427/162 |
| 5,958,577 A * | 9/1999 | Sugimoto | 423/338 |

FOREIGN PATENT DOCUMENTS

| | | | | |
|---|---|---|---|---|
| GB | 2269377 | * | 2/1994 | 423/338 |
| WO | 97/32815 | * | 9/1997 | 423/338 |
| WO | 9937705 | | 7/1999 | |

OTHER PUBLICATIONS

"Oil–Water Interface Templating of Mesoporous Macroscale Structures," by S. Schacht et al., Science, vol. 273, pp. 768–771, Aug. 9, 1996.
"Mesostructure Design with Gemini Surfactants: Supercage Formation in a Three–Dimensional Hexagonal Array," by Q. Huo et al., Science, vol. 268, pp. 1324–1327, Jun. 2, 1995.
"Ordered mesoporous molecular sieves synthesized by a liquid–crystal template mechanism," by C. T. Kresge et al., Nature, vol. 359, pp. 710–712, Oct. 22, 1992.
"Aerosol–assisted self–assembly of mesostructure spherical nanoparticles," by Yunfeng Lu et al., Nature, vol. 398, pp. 223–226, Mar. 18, 1999.
"Micrometer–Sized Mesoporous Silica Spheres Grown under Static Conditions," by Limin Qi et al., Chem. Mater., vol. 10, No. 6, pp. 1623–1626, 1998.
"A Novel Pathway Towards MCM–41 Related Mesoporous Monodisperse Silica Spheres in the Submicrometer and Micrometer Range," by M. Grun and K. K. Unger, 12th International Zeolite Conference, pp. 757–761, 1999. (No month).
"Novel Synthesis of Spherical MCM–48," by K. Schumacher et al., Elsevier Science B. B., pp. 201–206, 1999. (No month).
"Preparation of Hard Mesoporous Silica Spheres," by Qisheng Huo et al., Chem. Mater., vol. 9, No. 1, pp. 14–17, 1997. (No month).
"Synthesis of Mesoporous Silica Spheres Under Quiescent Aqueous Acidic Conditions," by Hong Yang et al., Chem. Mater, vol. 8, pp. 743–750, Mar., 1998.
"The Synthesis of Micrometer– and Submicrometer–Size Spheres of Ordered Mesoporous Oxide MCM–41," by Michael Gruin et al., Advanced Materials, vol. 9, No. 3, pp. 254–257, 1997.
Zhao et al, "Nonionic Triblock and Star Diblock . . . Mesoporous Silica Structures", J. Am. Chem. Soc., 120, pp. 6024–6036, 1998.*
Huo et al, "Surfactant control of Phases . . . Mesoporous Silica–based Materials", Chem. Mater., 8, 1147–1160, 1996.*
Gallis et al, Synthesis of MCM–48 by a Phas Transformation process, Chem. Mater., 9, 2035–2038, 1997.*

* cited by examiner

Primary Examiner—Ngoc-Yen Nguyen
(74) Attorney, Agent, or Firm—Downs Rachlin & Martin PLLC

(57) ABSTRACT

A method of preparing mesoporous silica from a reaction mixture comprising a mineral acid such as HCl, an inorganic oxide source such as tetraethoxysilane, a surfactant such as cetyltrimethlyammonium bromide and water. The reaction mixture is mixed, e.g., by stirring or sonication, until sufficiently polymerized that mesostructured silica may be formed by a subsequent heating step, as indicated by the reaction mixture becoming opaque. This mixing is typically performed at room temperature for about 30–70 minutes. Then, the reaction mixture is heated in a pressurized vessel at a time, temperature and pressure sufficient to form mesostructured silica, e.g., at 60 to 230° C. for 15 to 80 minutes. Finally, mesoporous silica is recovered by filtering, drying and calcining in a furnace having a temperature in the range of 400 to 600° C. in air for at least 6 hours. Mesoporous silica made in accordance with present invention has pores with a narrow diameter distribution (23–24 Å), but with highly disordered placement relative to one another. As a result, the mesoporous silica is characterized by powder X-ray diffraction pattern having no discernible peaks or one unusually broad peak with very low intensity. Furthermore, a large percentage of the mesoporous silica particles are spherical, i.e., more than 50% and typically in excess of 80%.

22 Claims, 3 Drawing Sheets

MESOPOROUS SILICATES AND METHOD OF MAKING SAME

This application claims benefit of Provisional Application Ser. No. 60/097,408, filed Aug. 21, 1998.

FIELD OF THE INVENTION

The present invention relates to acid prepared mesoporous silica spheres and methods of synthesizing the same.

BACKGROUND OF THE INVENTION

Porous silica is commonly use as a matrix material for chromatographic separations. With surface areas in the neighborhood of 300 $m^2/g$, commercially available chromatographic grade silicas possess a relatively high surface area. Mesoporous materials, which typically possess surface areas in excess of 1000 $m^2/g$ and even as high as 1600 $m^2/g$, are commonly used as adsorbents, catalysts, and catalytic supports. With such high surface areas, these materials should provide superior separating ability as a chromatographic matrix in liquid chromatography (LC), flash liquid chromatography (FLC), and high performance liquid chromatography (HPLC).

Various techniques exist for synthesizing mesoporous silica. For example, U.S. Pat. No. 4,554,211 to Arika et al., discloses a technique for synthesizing mesoporous silica spheres using an emulsion templating mechanism in basic solution. Other patents describing techniques for synthesizing large pore oxides in basic solution include U.S. Pat. No. 5,068,216 to Johnson et al., U.S. Pat. No. 5,168,828 to Degnan et al., and U.S. Pat. No. 5,308,602 to Calabro et al. Recently, processes have been developed for synthesizing mesoporous silica spheres in acidic solution. In an article by Stucky et al., Oil-water Interface Templating of Mesoporous Macroscale Structures, *Science*, 1996, 273, 768–771 an emulsion process for synthesizing mesoporous silica spheres was described. A silicon alkoxide (TEOS) was dissolved in an organic solvent, typically mesitylene. This mixture was added, slowly over a period of 30 minutes, to an aqueous acidic solution containing a cationic ammonium surfactant (CTAB). Stucky found that by varying the stir rate during the course of the reaction, the particle morphology could be changed. At slower stirring rates, the reaction mixture produced fibers, and as the stirring rate was increased, the amount of fibers decreased with the increasing amounts of spheres. It was shown that the size of the spherical particles decreases with increasing stirring rates. Scanning Electron Microscopy (SEM) indicated the particles were hollow and spherical in nature. It was shown that these hollow spheres were brittle, and could be crushed with a spatula. The brittle nature of the spheres, in combination with the fact that they were not porous throughout their interior, seemed to indicate unfavorable characteristics for their use as a chromatographic matrix.

Qi et al., in the article Micrometer-Sized Mesoporous Silica Spheres Grown Under Static Conditions, *Chemistry of Materials*, 1998, 10, 1623–1626, describes the formation of mesoporous silica spheres by a process using a cationic-nonionic surfactant mixture in aqueous acidic conditions. A typical synthesis involved stirring an aqueous acidic solution of a cationic ammonium surfactant (CTAB), and a nonionic surfactant (decaethylene glycol monohexadecylether), to which an alkoxysilane was added (TEOS). This material was presumably porous throughout its interior, although this was not specifically addressed in the article. The material seems to possess desirable characteristics, a high surface area (1042 $m^2/g$) and ~5 $\mu$m particle size, for use as a chromatographic matrix, but the long synthesis time (16 hours) and the use of a mixture of surfactants rather than one does not seem desirable for use on a commercial scale.

Yet another process for synthesizing mesoporous silica spheres in acidic aqueous solution is described by Ozin et al., in the article Synthesis of Mesoporous Spheres Under Quiescent Aqueous Acidic Conditions, *Journal of Materials Chemistry*, 1998, 8(3), 743–750. An acidic aqueous solution consisting of an alkoxysilane (TEOS) and a cationic ammonium surfactant (CATCl), was allowed to react under static conditions for a period of 7–10 days at 80° C. It was also demonstrated that spherical particles could be synthesized at room temperature with a modified reaction imixture. Particle sizes appeared to range from 1–30 $\mu$m. While the spheres Ozin et al. produced are monodisperse, the lower surface area (750 $m^2/g$) and long synthesis time (7–10 days) makes the material and process unattractive for use on a commercial scale. All of the processes described above produce materials which exhibit regular powder X-ray diffraction patterns with one or more relatively narrow diffraction peaks. This indicates that they contain a relatively ordered arrangement of pores. It appears that the materials produced by these processes are similar to SBA-3, a mesoporous material with a hexagonal arrangement of linear pores ("Mesostructure Design with Gemini Surfactants: Supercage Formation in a Three-Dimensional Array", Huo et al., *Science*, 1995, 268, 1324). SBA-3 is similar to the more widely known MCM-41, which has an identical arrangement of pores but is synthesized in basic solution ("Ordered Mesoporous Molecular Sieves Synthesized by a Liquid-Crystal Templating Mechanism," Kresge et al., *Nature*, 1992, 359, 710). While mesoporous silica having such ordered pores has use in a variety of contexts, the processes for synthesizing such materials tends to take longer, or be more complex, than is commercially desired. The present invention relates to acid-prepared mesoporous silicates and methods of synthesizing same.

SUMMARY OF THE INVENTION

One aspect of the present invention is a method of forming mesoporous inorganic oxide particles in which at least 50% of the particles are spherical. The method involves first preparing a reaction mixture capable of forming said mesoporous inorganic oxide particles.

The reaction mixture comprises:
i. a mineral acid selected from the group consisting of HCl, HBr and HI;
ii. an inorganic oxide source consisting of a compound having a formula Si(OR1)(OR2)(OR3)(OR4) where Si is silicon, O is oxygen and R1, R2, R3 and R4 are alkyl chains having 1 to 4 carbon atoms;
iii. a surfactant consisting of one or more members of the group consisting of:
  (1) a cationic ammonium having a formula R1R2R3R4N+X−, where R1, R2 and R3 are alkyl chains consisting of 1 to 6 carbon atoms, R4 is an alkyl chain consisting of 12 to 24 carbon atoms and X− represents a counterion to said surfactant selected from the group consisting of Cl-, Br-, I- and OH-;
  (2) a cationic diammonium having a formula [R1R2R3N+R4N+R5R6R7]X−X−, where R1, R2, R5 and R6 represent alkyl chains consisting of 1 to 6 carbon atoms, R3 represents an alkyl chain of 12 to 24 carbon atoms, R4 represents an alkyl chain of 3 to 16 carbon atoms, R7 represents an alkyl chain of 1 to 24 carbon atoms, and X− represents a counterion to the surfactant which may be Cl-, Br-, I- or OH-; and (3) a tri-block copolymer $EO_xPO_yEO_z$, where EO is polyethylene oxide, PO is polypropylene oxide and x ranges from 5 to 106, y ranges from 30 to 85 and z ranges from 5 to 106; and iv. water.

As the next step in the method, the reaction mixture is mixed sufficiently so that mesostructured inorganic oxide particles may be formed in a subsequent heating step. This latter step involves heating the reaction mixture at a temperature and for a time sufficient to form mesostructured inorganic oxide particles, at least 50% of which are spherical. Finally, organic material is removed from the mesostructured inorganic oxide particles so as to form mesoporous inorganic oxide particles.

Another aspect of the present invention is a method of performing a liquid chromatographic separation of a liquid or dissolved solid compound using the mesoporous inorganic oxide synthesized using the process described above. This method involves packing a chromatography column with a slurry of such mesoporous inorganic oxide. The slurry includes an organic solvent selected as a function of the liquid or dissolved solid compound to be separated. Next, the liquid or dissolved solid compound is added to the slurry of mesoporous inorganic oxide. Finally, a mobile phase of the liquid or dissolved compound is retrieved from the chromatography column.

These and other aspects of the present invention are described in more detail below, are illustrated in the accompanying drawings and are set forth in the appended claims.

DETAILED DESCRIPTION OF THE INVENTION

Figure 1:
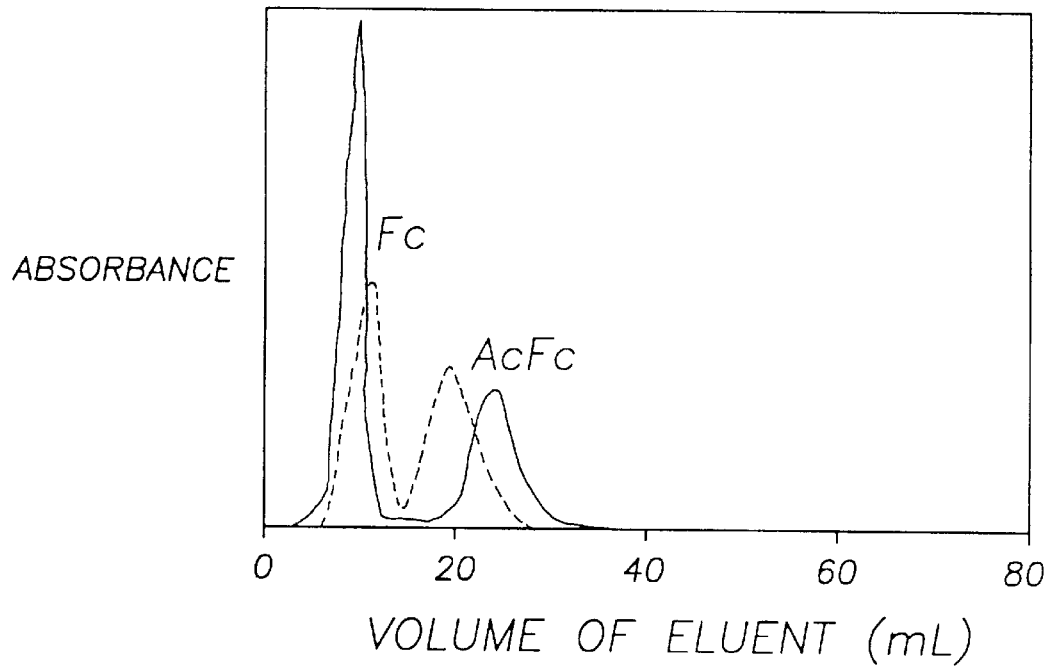
FIG. 1 is a graph showing, in solid line, the absorbance of Ferrocene (Fc) and Acetylferrocene (AcFc) per volume of eluent achieved in liquid chromatography using as the stationary phase commercially available liquid chromatography silica particles, and in dotted line, the absorbance of Fc and AcFc per volume of eluent achieved using a commercially available flash liquid chromatography silica.

The present invention is a method of synthesizing a highly porous, i.e., mesoporous, non-crystalline, inorganic oxide (MIO) using an acidic aqueous reaction procedure in a significantly shorter period of time than is required with known acidic solution syntheses for similar oxides. MIO differs from conventional porous inorganic oxides in that their surface areas are significantly greater than those of conventional porous inorganic oxides, i.e., a surface area in excess of 600 $m^2/g$ and in some cases as high as 1,600 $m^2/g$. By comparison, a well known inorganic oxide, conventional chromatographic grade silicas, generally have a surface area less than 500 $m^2/g$, and commonly less than 300 $m^2/g$.

MIO prepared in accordance with the present method has a high percentage of spherical particles as determined by scanning election microscopy (SEM). At least 50% of the MIO particles produced by the present method are spherical, with 80–90% of the particles typically being spherical. In addition, there is a relatively narrow particle size distribution, i.e., virtually all of the MIO prepared with the method of the present invention has a particle size falling in the range 1–15 $\mu$m. The process is typically controlled to yield MIO with particle diameters in the 3–8 $\mu$m range. 5 Pore volumes of MIO synthesized using the present method lie in the range 0.35–0.75 $cm^3/g$.

Also, the relative placement of pores of the MIO is highly disordered. Powder X-ray diffraction reveals a notable absence of discernible peaks in the MIO; occasionally one unusually broad peak of low intensity is produced. The large surface area and particle size in the range of about 5 $\mu$m makes the MIO highly desirable in chromatography, as discussed more below.

MIO is synthesized using a three-step process involving an initial mixing of a reaction mixture containing an inorganic oxide source, one or more surfactants, a mineral acid and water. The reaction mixture may also contain a metal salt. As the second step, the reaction mixture is heated for a selected time and temperature, and then the resulting product is collected, dried and calcined.

Describing the process in more detail, the inorganic oxide source is a compound of the type Si(OR1)(OR2)(OR3)(OR4), where Si is silicon, O is oxygen, and Rn represents an alkyl chain containing 1 to 4 carbon atoms. The four OR groups may be identical, each may be different from the others, or some may be the same and others different. Furthermore, the inorganic oxide source may consist of a mixture of these compounds. One suitable inorganic oxide source is TEOS (tetraethoxysilane).

The surfactant may consist of a molecule with the formula R1R2R3R4N+X−, where R1, R2 and R3 represent alkyl chains consisting of 1 to 6 carbon atoms, R4 represents an alkyl chain consisting of 12 to 24 carbon atoms, and X− represents a counterion to the surfactant which may be Cl-, Br-, I- or OH-. The surfactant may also consist of a molecule with the formula [R1R2R3N+R4N+R5R6R7]X−X−, where R1, R2, R5 and R6 represent alkyl chain of 1 to 6 carbon atoms, R3 represents an alkyl chain of 12 to 24 carbon atoms, R4 represents an alkyl chain of 3 to 16 carbon atoms, R7 represents an alkyl chain of 1 to 24 carbon atoms, and X− represents a counterion to the surfactant which may be Cl-, Br-, I- or OH-. One suitable surfactant is CTAB (cetyltrimethylammonium bromide). Alternatively, the surfactant may consist of a triblock co-polymer represented by the formula $EO_xPO_yEO_z$, where EO represents polyethylene oxide, PO represents polypropylene oxide, and x ranges from 5 to 106, y ranges from 30 to 85 and z ranges from 5 to 106. A suitable composition is $EO_{20}PO_{70}EO_{20}$. Various mixtures of these three classes of surfactants may also be used, e.g., 75% CTAB/25% triblock co-polymer, 50%

CTAB/50% triblock copolymer and 25% CTAB/75% triblock copolymer, all weight %, with (CTAB and triblock copolymer) weight %=100%.

The mineral acid may be HCl, HBr or HI.

The optional metal salt has the formula $MnX_y$, where M is a metal cation, X is an anion such as chloride, bromide, iodide, acetate, sulfate, nitrate or acetylacelonate, n is 1 or 2, and y is 1, 2, 3 or 4. M may be any transition metal, including without limitation, cobalt, copper, iron, molybdenum, nickel, palladium, platinum, ruthenium, titanium, zirconium. Alternatively, M may be a rare earth or Group 13 metal cation. The metal cation may also have the formula $Al(OR1)(OR2)(OR3)$, where Al is aluminum, O is oxygen and R1, R2 and R3 are alkyl chains having 1 to 4 carbon atoms.

The constituents of the reaction mixture are combined and then mixed until chemically homogeneous. This mixing may be accomplished by stirring, by sonication involving use of a sonication horn of the type sold by Heat Systems-Ultrasonics Inc., 1938 New Highway, Farmingdale, N.Y. 11735, operating at a frequency and maximum power, respectively, of 20,000 kHz and 475 watts, or by other techniques yielding a chemically homogeneous mixture. The mixing is performed at room temperature for preparations excluding the triblock copolymer, although any temperature in the range 15–30° C. for preparations excluding the triblock copolymer is satisfactory. For preparations including the triblock copolymer, mixing temperatures in the range 25–45° C., preferably about 30–40° C., are used for the mixing step. Typically, a chemically homogeneous mixture is achieved with about 3 to 70 minutes of mixing when the triblock copolymer is not used, with mixing time varying with the composition of the RXN mixture. When the triblock copolymer is used, mixing times in the range of 50 to 120 minutes are used, again with the time varying with the chemical composition of the reaction mixture. While it is typically advantageous to achieve chemical homogeneity as quickly as possible, in some cases it may be desirable to extend the mixing period. This can be achieved by reducing the acid concentration. Suitable reduction of acid concentration can increase the period of mixing required to achieve chemical homogeneity such that 12 hours or more is needed. In addition to observance of these time and temperature parameters, the reaction mixture becomes opaque when the required amount of polymerization of the reaction mixture has been achieved to permit synthesis of the MIO in following steps. As used in this context and in the claims, an "opaque" mixture means a mixture having a transparent to white color and containing a suspension of very small particles that cannot be captured by Buchner filtration on VWR qualitative filter paper grade 413.

As the next step in the synthesis of MIO, the reaction mixture is transferred to a high pressure reaction vessel such as a Teflon(t-lined stainless steel autoclave of the type sold by Parr Instruments Co, 211 Fifty-Third Street, Moline, Illinois and identified as model number 4748 or 4749. There, the reaction mixture is heated to a temperature in the range 60–230° C., preferably 130–190° C., and maintained there for a period of 15 to 80 minutes. Lower temperatures require longer heating times. Preferably, the reaction mixture is not stirred during this heating step. The product resulting from this step is mesostructured MIO. This material has the desired mesostructure, although the pores are filled with organic material (surfactant) that is removed in the final step.

Finally, the mesostructured MIO is removed from the reaction vessel and dried by conventional techniques such as vacuum filtration. Then, organic material in the mesostructured MIO is burned away. This is accomplished by heating the material to a temperature in the range 400–600° C. with a temperature ramp of 0.2 to 5° C./minute, preferably no more than about 2° C./minute, and then maintaining it at such temperature for at least 6 hours, with longer periods of time generally being required. Preferably, such removal of organic material is accomplished in a two-step process where the mesostructured MIO is heated at a temperature ramp of about 2° C./minute to a temperature of about 450° C. where it is maintained for about 4 hours. Then, the temperature is elevated at a temperature ramp of about 10° C./minute to 550° C. where it is maintained for about 8 hours. The surfactant may also be removed by ion exchange using dilute HCl dissolved in ethanol.

In connection with the following examples, the physical data reported below were obtained as follows. Surface areas were measured using the BET technique described in the article by S. Brunauer et al. in the *Journal of the American Chemical Society*, 1938, volume 60, page 309. Pore size distributions were determined using the BJH technique described in the article by E. Barrett et al. in the *Journal of the American Chemical Society*, 1951, volume 73, page 373. Scanning electron micrographs (SEMs) were taken on a JEOL JSM-T300 instrument operating at 20 kV. Samples were sputtered with gold to reduce charging.

Mole ratio ranges for all of the examples provided below are:

| | |
|---|---|
| $H_2O$ | 394.85–10048 |
| HCl | 5.85–152.06 |
| CTAB | 0–7.63 |
| Triblock | 0–1 |
| TEOS | 3.29–58.63 |
| $Al(OPr)_3$ | 0–limit of solubility |
| $AlCl_3$ | 0–limit of solubility |
| $CuCl_2\ 2H_2O$ | 0–limit of solubility |
| $NiCl_2\ 6H_2O$ | 0–limit of solubility |
| $TiCl_3$ | 0–limit of solubility |

EXAMPLE

Examples 1a–1j

Water (11.1 g, distilled and deionized) was placed in a 150 ml beaker along with CTAB (cetyltrimethylammonium bromide, 0.24 g, Aldrich), HCl (0.95 g, 37%, J T Baker) and TEOS (tetraethoxysilane, 1.13 g, 98%, Aldrich). The mixture was polymerized by stirring at room temperature until opaque (about 1 hour), and then was transferred to and heated in an autoclave (Parr bomb model 4749) for times and temperatures listed below in Table 1. After heating, the reaction mixture was allowed to cool to room temperature, was filtered, dried and then calcined in air at 550° C.

Analysis of the product resulting from Examples 1a–1j, set forth in Table 1, indicates mesoporous silica was produced having a high percentage of spherical particles. Indeed all samples yielded at least 50% spherical particles, with most samples having more than 90% spherical particles. The mesoporous nature of the silica is confirmed by the surface area data; all samples are in excess of 900 $m^2/g$ surface area as determined using the BET technique. Pore diameter and pore volume data (determined using the BJH technique) are also consistent with mesoporosity.

TABLE 1

| Sample ID | Temp (° C.) | Heating Time (min) | Surface Area (m₂/g) | Pore Diameter (Å) | Pore Volume (cm₃/g) | % Spheres |
|---|---|---|---|---|---|---|
| 1a | 230 | 15 | 944 | 24 | 0.44 | >80% |
| 1b | 210 | 20 | 1017 | 24 | 0.52 | >90% |
| 1c | 190 | 30 | 1124 | 23 | 0.60 | >90% |
| 1d | 170 | 40 | 1018 | 24 | 0.55 | >90% |
| 1e | 150 | 40 | 1186 | 24 | 0.64 | >90% |
| 1f | 130 | 50 | 995 | 24 | 0.48 | >90% |
| 1g | 115 | 60 | 960 | 24 | 0.49 | >90% |
| 1h | 100 | 60 | 971 | 24 | 0.52 | >90% |
| 1i | 80 | 70 | 1043 | 23 | 0.56 | >70% |
| 1j | 60 | 80 | 1069 | 23 | 0.56 | ~50% |

Example 2

Water (55.5 g, distilled and deionized) was placed in a 150 ml beaker along with CTAB cetyltrimethylammonium bromide, 1.20 g, Aldrich), HCl (4.50 g, 37%, J T Baker) and TEOS tetraethoxysilane, 5.65 g, 98%, Aldrich). The mixture was polymerized by stirring at room emperature until opaque (about 1 hour), and then was transferred to and heated in an autoclave (Parr bomb model 4748) for 40 minutes at 150° C. After heating, the reaction mixture was allowed to cool to room temperature, was filtered, dried and then calcined in air at 550° C.

Example 3

Water (11.1 g, distilled and deionized) was placed in a 150 ml beaker along with CTAB (cetyltrimethylammonium bromide, 0.24 g, Aldrich), HCl (0.70 g, 37%, J T Baker) and TEOS (tetraethoxysilane, 1.13 g, 98%, Aldrich). The mixture was polymerized by stirring at room temperature until opaque (about 1 hour), and then was transferred to and heated in an autoclave (Parr bomb model 4749) for 40 minutes at 150 ° C. After heating, the reaction mixture was allowed to cool to room temperature, was filtered, dried and then calcined in air at 550° C.

Example 4

Water (11.1 g, distilled and deionized) was placed in a 150 ml beaker along with CTAB (cetyltrimethylammonium bromide, 0.24 g, Aldrich), HCl (4.0 g, 37%, J T Baker) and TEOS (tetraethoxysilane, 1.13 g, 98%, Aldrich). The mixture was polymerized by stirring at room temperature for 3 minutes (until opaque), and then was transferred to and heated in an autoclave (Parr bomb model 4749) for 40 minutes at 150° C. After heating, the reaction mixture was allowed to cool to room temperature, was filtered, dried and then calcined in air at 550° C.

Example 5

Water (11.1 g, distilled and deionized) was placed in a 150 ml beaker along with CTAB (cetyltrimethylammonium bromide, 0.16 g, Aldrich), HCl (0.95 g, 37%, J T Baker) and TEOS (tetraethoxysilane, 1.13 g, 98%, Aldrich). The mixture was polymerized by stirring at room temperature until opaque (about 1 hour), and then was transferred to and heated in an autoclave (Parr bomb model 4749) for 40 minutes at 150° C. After heating, the reaction mixture was allowed to cool to room temperature, was filtered, dried and then calcined in air at 550° C.

Example 6

Water (11.1 g, distilled and deionized) was placed in a 150 ml beaker along with CTAB (cetyltrimethylammonium bromide, 0.60 g, Aldrich), HCl (0.95 g, 37%, J T Baker) and TEOS (tetraethoxysilane, 1.13 g, 98%, Aldrich). The mixture was polymerized by stirring at room temperature until opaque (about 1 hour), and then was transferred to and heated in an autoclave (Parr bomb model 4749) for 40 minutes at 150° C. After heating, the reaction mixture was allowed to cool to room temperature, was filtered, dried and then calcined in air at 550° C.

Example 7

Water (40.0 g, distilled and deionized) was placed in a 150 ml beaker along with $EO_{20}PO_{70}EO_{20}$ (1.33g, 5,800 g/mol Aldrich), HCl (3.50 g,37%, J T Baker) and TEOS (tetraethoxysilane, 2.85 g, 98%, Aldrich). The mixture was polymerized by stirring at 35° C. for 110 minutes (until opaque), and then the mixture was transferred to and heated in an autoclave (Parr bomb model 4748) for 40 minutes at 150° C. After heating, the reaction mixture was allowed to cool to room temperature, was filtered, dried and then calcined in air at 550° C.

Example 8a

Water (40.0 g, distilled and deionized) was placed in a 150 ml beaker along with a surfactant mixture comprising 75 wt % CTAB/25 wt % triblock copolymer, i.e., CTAB (cetyltrimethylammonium bromide, 0.66 g, Aldrich) and $EO_{20}PO_{70}EO_{20}$ (0.33 g, 5,700 g/mol Aldrich), HCl (3.50 g,37%, J T Baker) and TEOS (tetraethoxysilane, 2.85 g, 98%, Aldrich). The mixture was polymerized by stirring at 35° C. for 110 minutes (until opaque), and then the mixture was transferred to and heated in an autoclave (Parr bomb model 4748) for 40 minutes at 150° C. After heating, the reaction mixture was allowed to cool to room temperature, was filtered, dried and then calcined in air at 550° C.

Example 8b

This example was performed under conditions identical to those of Example 8a, except that the ratio of CTAB to triblock copolymer was changed to 25 wt % CTAB/ 75 wt % triblock copolymer, (cetyltrimethylammonium bromide, 0.22 g, Aldrich) and $EO_{20}PO_{70}EO_{20}$ (1.00 g, 5,800g/mol Aldrich), with all other conditions being the same.

For Examples 8a and 8b, with the $H_2O$:HCl:TEOS molar ratios of 1004.8:152.06:58.63, the molar ratios of CTAB-:triblock copolymer may be 0–7.63:0.25–1.00, so long as the total weight percent of (CTAB +triblock copolymer)=100%. It is believed that porosity data consistent with that reported below in Table 2 will be achieved across this entire molar ratio range.

Example 9

Water (55.5 g, distilled and deionized) was placed in a 150 ml beaker along with a surfactant mixture comprising 75 wt % CTAB/25 wt % triblock copolymer, i.e., CTAB (cetyltrimethylammonium bromide, 0.9 g, Aldrich) and $EO_{20}PO_{70}EO_{20}$ (0.46 g, 5,800g/mol Aldrich), HCl (4.50 g, 37%, J T Baker) and TEOS (tetraethoxysilane, 5.65 g, 98%, Aldrich). The mixture was polymerized by stirring at room temperature until opaque (about 1 hour), and then the mixture was transferred to and heated in an autoclave (Parr bomb model 4748) for 40 minutes at 150° C. After heating, the reaction mixture was allowed to cool to room temperature, was filtered, dried and then calcined in air at 550° C.

Variations of this Example 9 were also performed with 50 wt % CTAB/50 wt % triblock copolymer and 25 wt %

CTAB/75 wt % triblock copolymer, with all other conditions being the same. Porosity data similar to that reported below for Example 9 was achieved. Furthermore, the present invention encompasses a broad range of molar ratios for CTAB and triblock copolymer. For Example 9 $H_2O$:HCl:TEOS molar ratios of 985.04:14.13:8.24, the molar ratios of CTAB:triblock copolymer may be 0.25–1.00:0–0.074, so long as the total weight percent of (CTAB +triblock copolymer)=100%. It is believed that porosity data consistent with that reported below in Table 2 will be achieved across this entire molar ratio range.

Example 10

Water (1 1.1 g, distilled and deionized) was placed in a 150 ml beaker along with CTAB (cetyltrimethylammonium bromide, 0.24 g, Aldrich), HCl (0.95 g, 37%, J T Baker), Al(OPr)$_3$ (aluminum isopropoxide, 0.02g, Aldrich) and TEOS (tetraethoxysilane, 1.13 g, 98%, Aldrich). This Si:Al mixture (50:1) was polymerized by stirring at room temperature until opaque (about 1 hour), and then was transfelTed to and heated in an autoclave (Parr bomb model 4749) for about 40 minutes at 150° C. After heating, the reaction mixture was allowed to cool to room temperature, was filtered, dried and then calcined in air at 550° C. Although not reported in Table 2, below, porosity data similar to that obtained for the other examples was obtained for this Example 10.

Variations of this Example 10 were also performed with AlCl$_3$ (aluminum chloride, 0.01 g, Aldrich) in place of the Al(O$^i$Pr)$_3$. Similar porosity data to that reported below in Table 2 was achieved for this variation of Example 10.

Example 11

Water (11.1 g, distilled and deionized) was placed in a 150 ml beaker along with CTAB (cetyltrimethylammonium bromide, 0.24 g, Aldrich), HCl (0.95 g, 37%, J T Baker), CuCl$_2$.2H$_2$O (copper(II) chloride hexahydrate, 0.02 g, Aldrich) and TEOS (tetraethoxysilane, 1.13 g, 98%, Aldrich). This Si:Cu mixture (50:1) was polymerized by stirring at room temperature until opaque (about 1 hour), and then was transferred to and heated in an autoclave (Parr bomb model 4749) for about 40 minutes at 150° C. After heating, the reaction mixture was allowed to cool to room temperature, was filtered, dried and then calcined in air at 550° C.

Example 12

Water (11.1 g, distilled and deionized) was placed in a 150 ml beaker along with CTAB (cetyltrimethylammonium bromide, 0.24 g, Aldrich), HCl (0.95 g, 37%, J T Baker), NiCl$_2$.6H$_2$O (nickel(II) chloride hexahydrate, 0.03 g, Aldrich) and TEOS (tetraethoxysilane, 1.13 g, 98%, Aldrich). This Si:Ni mixture (50:1) was polymerized by stirring at room temperature until opaque (about 1 hour), and then was transferred to and heated in an autoclave (Parr bomb model 4749) for about 40 minutes at 150° C. After heating, the reaction mixture was allowed to cool to room temperature, was filtered, dried and then calcined in air at 550° C.

Example 13

Water (11.1 g, distilled and deionized) was placed in a 150 ml beaker along with CTAB (cetyltrimethylammonium bromide, 0.24 g, Aldrich), HCl (0.95 g, 37%, J T Baker), TiCl$_3$ (titanium (III) chloride hexahydrate, 0.02g, Aldrich) and TEOS (tetraethoxysilane, 1.13 g, 98%, Aldrich). This Si:Ti mixture (50:1) was stirred, and allowed to polymerize, at room temperature until opaque (about 1 hour), and then was transferred to and heated in an autoclave (Parr bomb model 4749) for about 40 minutes at 1 50° C. After heating, the reaction mixture was allowed to cool to room temperature, was filtered, dried and then calcined in air at 550° C.

Porosity tests performed with respect to materials synthesized in Examples 3–13 (not including the variations for Examples 9 and 10) clearly demonstrate MIO was achieved, as reported in Table 2 below. It is believed that porosity data for the variations of Examples 9 and 10 will be consistent with the porosity data provided below for the standard conditions for Examples 9 and 10. Under the mixed surfactant conditions of Examples 8a, 8b, and 9, a dual phase mesoporous material is formed with two distinct pore sizes as determined by the BJH method. The first pore size reported in Table 2 is due to the CTAB surfactant, while the second is due to the triblock copolymer surfactant.

TABLE 2

POROSITY DATA

| Example # | Surface Area (m$^2$/g) | Pore Diameter (Å) | Pore Volume (cm$^3$/g) |
|---|---|---|---|
| 2 | 1174 | 25 | 0.67 |
| 3 | 1124 | 24 | 0.61 |
| 4 | 928 | 23 | 0.48 |
| 5 | 874 | 24 | 0.42 |
| 6 | 1189 | 25 | 0.42 |
| 7 | 583 | 34 | 0.34 |
| 8a | 937 | 27,42 | 0.61 |
| 8b | 1000 | 24,35 | 0.65 |
| 9 | 1094 | 23,36 | 0.65 |
| 11 | 1090 | 24 | 0.57 |
| 12 | 812 | 24 | 0.41 |
| 13 | 1261 | 24 | 0.74 |

Applications in Chromatography

Small silica particles, i.e., about 5 µm, are often used in liquid chromatography when high resolution separations are required, due to the direct relationship between plate height and particle size. MIO made in accordance with the process described above has been determined to function hightly effectively as the stationary phase in liquid chromatography ("LC"). Such MIO has application in various forms of liquid chromatography including conventional LC, and under the pressurized regimes of normal phase flash liquid chromatography (FLC), and high pressure liquid chromatography ("HPLC"), including reverse phases of both. A problem with the use of small particles is backpressure; this problem may be alleviated by applying pressureto the column as in FLC and HPLC.

To demonstrate the viability of MIO made using the method described above, several separations were performed using different liquid chromatography processes, as reported below in Examples 14–18.

Example 14

A normal phase separation was performed using a sample of 3.5 g of MIO obtained by the method described above in Example 2. The sample was placed in a 50 ml solvent mixture of ethylacetateb and hexane (hexane/EtOAc, 83/17 v/v %) and mixed to form a slurry. The slurry was added to fritted glass column having a 10 mm inside diameter and length of 11 cm. A 100 mg sample of ferrocene and acetylferrocene, 50 mg of each, dissolved in the same solvent mixture, was separated by flash liquid chromatography. Fractions were taken every 2.0 ml, allowed to dry, resuspended in acetone, and absorbances were read in a Spec 21.

Figure 2:
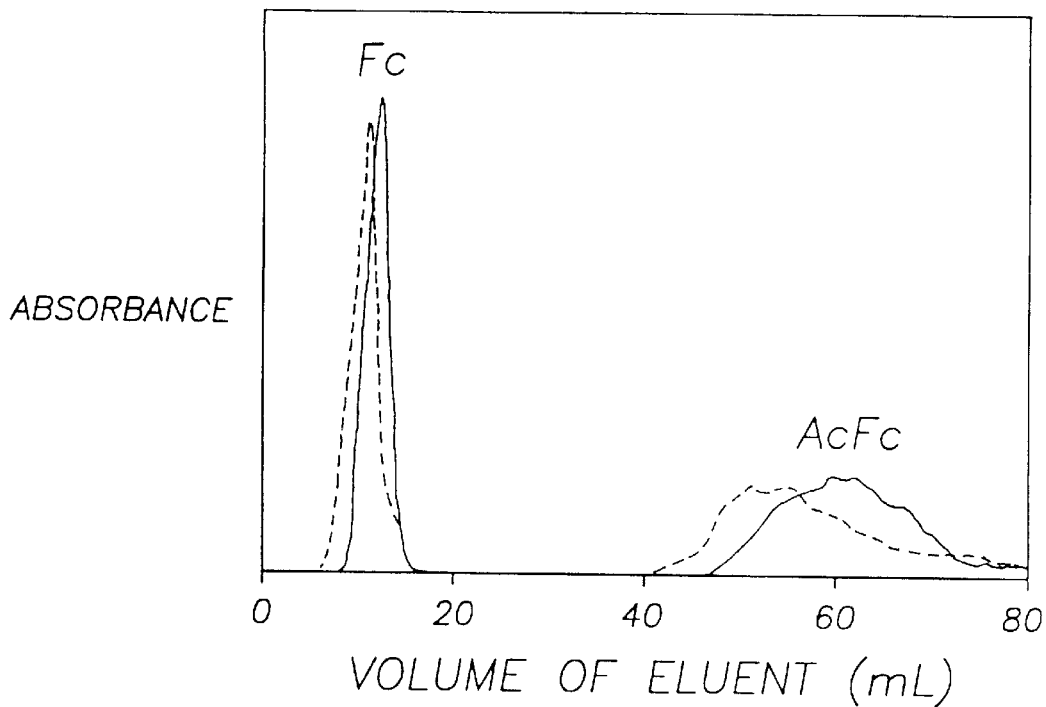
FIG. 2 is a graph showing, in solid line, the absorbance of the same amount of Fc and AcFc per volume of eluent achieved in liquid chromatography using as the stationary phase mesoporous silica particles made in accordance with the method of the present invention, and in dotted line, the absorbance of Fc and AcFc per volume of eluent achieved using SBA-3 silica.

To assess the results of the separation of Example 14, FIG. 1 depicts the separation of Fc and AcFc using commercially available liquid chromatography silica, in solid line, and commercially available flash liquid chromatography silica in dotted line. FIG. 2 represents separation data using the MIO of Example 2, in solid line, and SBA-3 (i.e., the type of mesoporous silicate prepared by Stucky et al., referenced above, and used for comparison here), in dotted line. As expected, under normal phase conditions the non-polar Fc molecule elutes first while the retention time ($t_R$) of the AcFc is longer due to its more polar nature as well as its ability to exhibit dipole interactions with silica silanols. Highly effective separation of the Fc and AcFc molecules was achieved using both the MIO of Example 2 and SBA-3, with the results of the separation of the MIO of Example 2 being slightly better than that of SBA-3. When an identical quantity of the Fc and AcFc mixture is passed through the same length of commercial liquid chromatography and flash liquid chromatography silica, as depicted in FIG. 1, a much less effective separation is achieved.

Example 15

A reverse phase separation of common enviroiimental contaminants was performed using a sample of 3.5 g of MIO obtained using the method described above in Example 2. The sample was suspended in dry toluene containing 1 equivalent of a tertiary amine. Octyldimethylchlorosilane (excess based on SiOH) was then added via syringe and the mixture was heated at reflux overnight. Then, the mixture was cooled, filtered, dried and washed with toluene and methanol. The alkyl chain ($C_8$ in this case) was covalently attached to the pore surfaces of the MIO by reaction with the Octyldimethylchlorosilane. Next, the mixture was slurry-packed into a conventional 150×4.6 mm stainless steel high performance liquid chromatography (HPLC) column with methanol, and a mixture of 5 µL each of uracil, benzene, biphenyl and naphthalene was injected into the column. Separation was performed by HPLC. The mobile phase was $H_2O$/MeOH (35/65 v/v %) at a flow rate of 1 mL/min and a 30° C. column temperature. Detection was performed using a UV detector at 254 nm.

Figure 3:
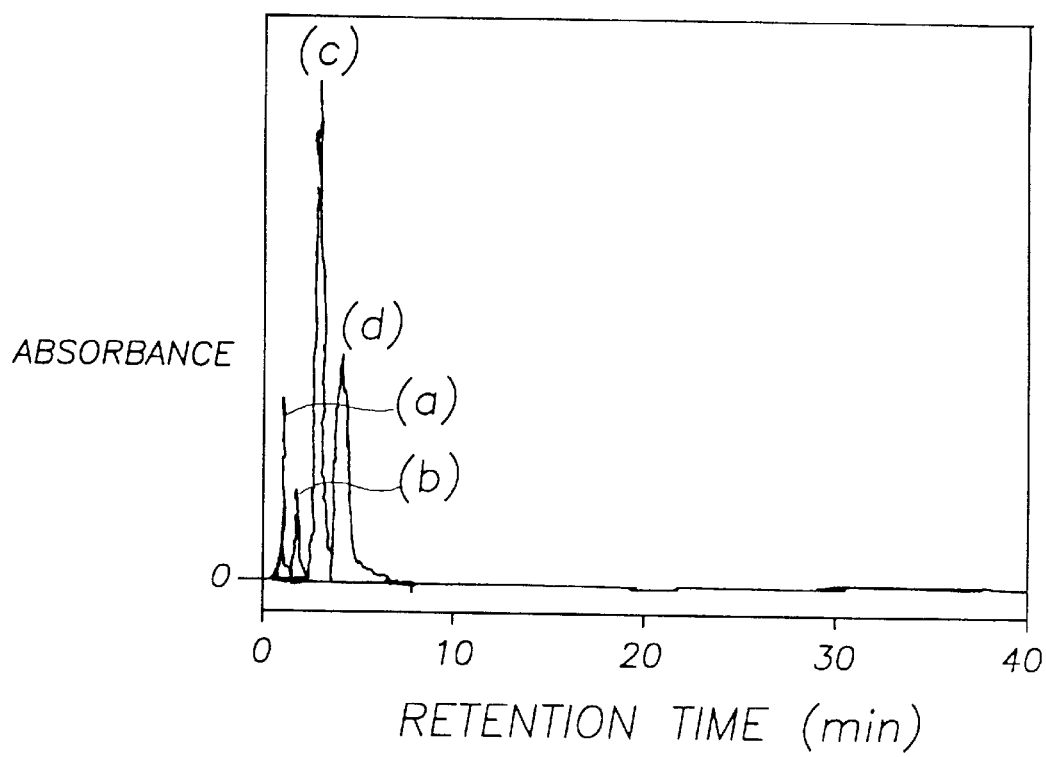
FIG. 3 is a graph showing the absorbance of (a) uracil, (b) benzene, (c) naphthalene and (d) biphenyl using as the stationary phase commercial reverse phase silica by reverse phase high pressure liquid chromatography.
Figure 4:
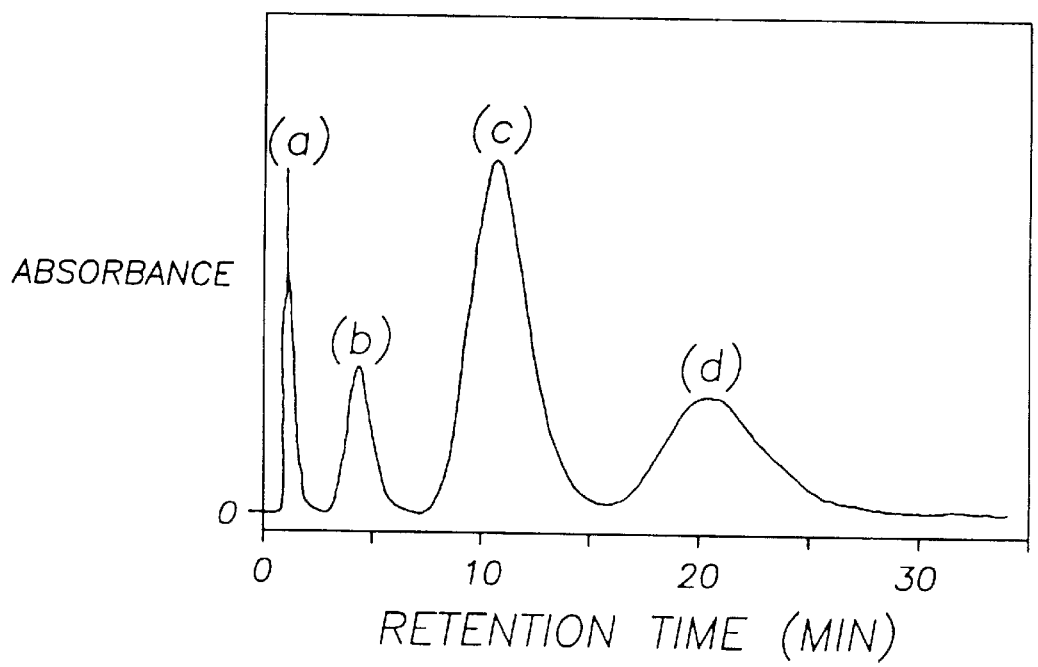
FIG. 4 is a graph showing the absorbance of (a) uracil, (b) benzene, (c) naphthalene and (d) biphenyl using as the stationary phase mesoporous silica particles made in accordance with one aspect of the method of the present invention.

A separation using a commercially available reverse phase silica (Hypersil MOS-2,5 µm particles, 120 Å pore diameter, $C_8$ bonded organic phase) was performed for comparison. A water/methanol mixture (35/65 v/v %) was then used as the mobile phase. As shown in FIG. 3, the Hypersil-$C_8$ used under HPLC conditions shows a relatively short retention time due to its low surface area. By comparison, as shown in FIG. 4, the $C_8$-MIO provides long retention times and baseline separation of all peaks. Another disadvantage to the use of the Hypersil-$C_8$ is its expense, which makes it undesirable as a routine "one-time-use" flash HPLC silica. $C_8$-MIO has a comparatively low cost, and its peaks may be directly collected (employing UV visualization), eliminating the necessity of using a TLC plate to spot fractions collected from the column. One problem, of course, is the larger volume of solvent required to elute samples and the peak broadening which necessarily accompanies longer retention times. Mesoporous silica may not be ideal for routine analytical separations, but for other separations it provides an excellent and cost-effective preparative separation medium.

Example 16

A chiral separation was performed using a sample of 3.5 g of MIO obtained using the method described above in Example 2. The sample was suspended in a $CH_2Cl_2$/toluene (50150 v/v %) mixture containing triethoxysilyl propylisocyanate (1:3 molar ratio based on $SiO_2$) and refluxed overnight. The resulting product was cooled and allowed to settle, the solvent removed with a double-tipped needle, and dried in vacuo. It was then resuspended in a $CH_2Cl_2$/toluene (50/50 v/v %) mixture and R-(+)-α-methylbenzylamine (1:1 molar ratio based on isocyanate) was added. The mixture was refluxed overnight, cooled, and dried in the same manner as above. It was then suspended in an EtOAc/hexane mixture (20/80 v/v %) and slurry packed into a fritted glass column (1.0×11 cm). Separation of 30 mg of S-(+)-N-(3,5-dinitrobenzoyl)-α-methylbenzylamine (98%, Aldrich) and 16 mg R-(-)-N-(3,5-dinitrobenzoyl)-α-methylbenzylamine (98%, Aldrich) was performed by flash liquid chromatography. Fractions were taken every 1.0 mL and the contents of each fraction were confirmed by thin layer chromatography and polarimetry.

While a baseline separation was not obtained with Example 16, the first fraction contained the (-)enantiomer, later fractions contained the (+)enantiomer, with middle fractions containing both (+,-), as determined by polarimetry.

Example 17

A chiral separation was performed using a sample of 3.5 g of MIO obtained using the method described above in Example 2. The sample was suspended in a $CH_2Cl_2$/toluene (50/50 v/v %) mixture containing triethoxysilyl propylamine (1:12 molar ratio based on $SiO_2$) and refluxed overnight. The resulting product was cooled and allowed to settle, the solvent removed with a double-tipped needle, and dried in vacuo. It was then resuspended in toluene and R-(-)-N-3,5-dinitrobenzoyl-a-phenylglycine (1:1 molar ratio based on propylamine) was added. The mixture was stilTed overnight, cooled, and dried in the same mainer as above. It was then suspended in MeOH and slurry packed into a conventional 100×3.2 mm stainless steel high performance liquid chromatography column. Separation of 40 mg of S-(+)-N-(3,5-dinitrobenzoyl)-α-methylbenzylamine (98%, Aldrich) and 20 mg R-(-)-N-(3,5-dinitrobenzoyl)-α-methylbenzylamine (98%, Aldrich) was performed by high pressure liquid chromatography. The mobile phase was $H_2O$/MeOH (35/65 v/v %). Detection was performed using a UV detector at 254 nm and partial separation of S-(-)-α-methyl(3,5-dinitrobenzyl) amine and R-(+)-α-methyl(3,5-dinitrobenzyl) amine was observed.

Example 18

Another chiral separation was performed using the MIO of Example 2. The MIO was slurry-packed into a conventional 100×3.2 mm stainless steel high performance liquid chromatography column using MeOH and a mixture of 6 mg S-(+)-N-(3,5-dinitrobenzoyl)-α-methylbenzylamine (98%, Aldrich) and 3 mg R-(-)-N-(3,5-dinitrobenzoyl)-α-methylbenzylamine (98%, Aldrich) and was then separated. The mobile phase was $H_2O$/MeOH (50/50 v/v %) containing 20 mM β-cyclodextrin. Detection was performed using a UV detector at 254 nm, and a near baseline separation was obtained. The first peak corresponded to the R(-) enantiomer and the second peak corresponded to the S(+) enantiomer.

Figure 5:
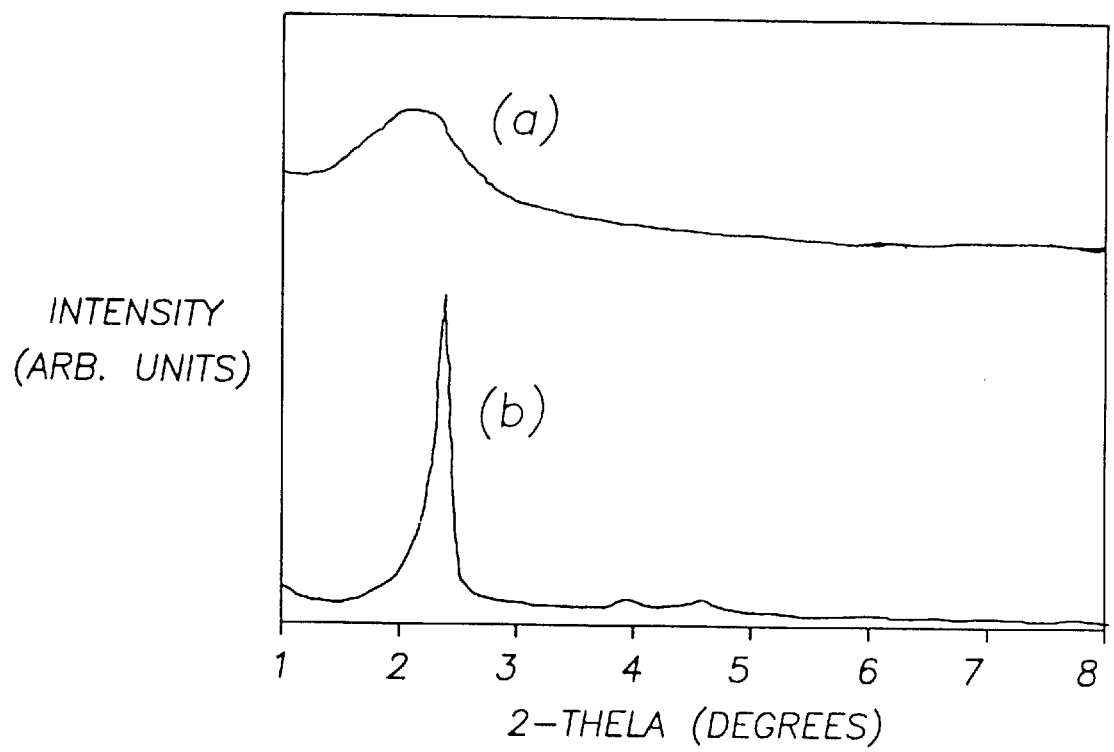
FIG. 5 is a graph showing the results of powder X-ray diffraction analysis of material produced by the method of the present invention, upper line a, and of SBA-3 silica.

As illustrated in FIG. 5, powder X-ray diffraction ("XRD") analysis of MIO produced by the method of the present invention, in particular material from Example 1, above, showed either one unusually broad peak with very low intensity or no diffraction at all, indicating a disordered product. XRD analysis was performed on a Scintag X1 θ-θ diffractometer equipped with a Peltier (solid-state thermo-electrically cooled) detector using Cu Kα radiation.

Disordered product is most likely due to the $S^+X^+I^+$ method of self-assembly that occurs in acidic solution, in which interactions between a catoinic surfactant and cationic silicate species are mediated by an anionic counterion. The interactions between the surfactant and silicate are therefore much weaker than in basic solution, where the silicate is anionic and interacts directly with the surfactant through electrostatic attraction ($S^+I^-$).

Recent research has shown that mesostructures synthesized in acidic solution can have highly variable particle morphologies. These mesostructures were synthesized using significantly lower concentrations of TEOS than that encompassed by the present invention. MIO produced in accordance with the present invention has a high concentration of spherical particles and a remarkably narrow particle size distribution. Test data for the various examples provided above indicates at least 50% of the MIO is spherical, with most preparations yielding more than 80% spheres, and some yielding more than 90% spheres. Furthermore, test data for most preparations indicates MIO particle diameter distribution in the 3–8 µm range, with all preparations yielding MIO particle diameter distribution in the 1–15 µm range.

SEM examination of MIO synthesized with the method of the present invention indicates some of the spheres are attached to each other and appear to have grown together. Calcination causes no changes in the overall structure; cracked or broken spheres are occasionally present prior to as well as after the calcination process. However, most particles appear to be intact.

By analogy to other syntheses of silica spheres, it appears the MIO of the present invention is formed by an emulsion templating method in which the heating step plays an important role. Since the reaction mixture of the present invention uses a relatively low concentration of acid (higher concentrations caused a precipitate to form much more quickly), the polymerization process happens slowly enough that significant amounts of TEOS remain unpolymerized even after 1 hour of stirring at room temperature. The heating step then serves to help emulsify the mixture of oil (TEOS) in water, with some surfactant present in both the TEOS 5 and water as well as at the interface. Heating is thought to accelerate the polymerization process, rapidly forming a highly porous silicate bead. Some silicate was observed to remain unpolymerized in solution outside of the beads, since heating for longer than 40 minutes produced spherical particles coated with amorphous aggregates, with significantly lower surface areas (~500 ml/g). These aggregates appear to consist of hexagonal plates similar to those normally observed for MCM-41, although their composition is not known.

Others have synthesized spherical mesoporous particles using an organic additive such as mesitylene as the emulsification agent, or were synthesized in basic solution using a more oily silicon alkoxide (tetrabutylorthosilicate) as the silicate source. In both syntheses, particle size is dependent upon the stirring rate. With the present invention, 3–5 µm spheres are routinely synthesized regardless of the stirring rate used and in the absence of any organic additive other than the inorganic oxide source described above. The explanation for this fact remains unclear; however, since the present method of synthesizing MIO preferably does not involve stirring during the heating step, the heating step must be important in the emulsification process. In fact, the particle size does appear to be dependant more upon the temperature at which the reaction mixture is heated rather than the stirring rate. The heating step is clearly important in accelerating the silicate polymerization process enough to trap the spheres as they are formed.

Important advantages of the present method of synthesizing MIO are its speed, simplicity and reproducibility. No specialized techniques, such as carefully controlled stirring rates or extremely slow additions of organic materials are required. In addition, the synthesis uses a relatively low concentration of acid and the best materials are obtained at very short reaction times, i.e., less than 2 hours for the mixing and heating steps for most compositions encompassed by the present invention. Other compositions can be synthesized in only slightly more than 2 hours. As noted above, if desired, the length of the mixing and heating steps may be increased to 12 hours or more by lowering the acid concentration of the reaction mixture.

Another advantage of the present invention is that highly homogeneous MIO particle size and shape is achievable with the present method. This avoids the need, and added expense, of post-synthesis processing to achieve the desired MIO particle size and shape.

These advantages are achieved in the context of MIO having a very high surface area. As such, the MIO has particular application as the stationary phase in liquid chromatography. Since certain changes may be made in the embodiments of the invention described above without departing from the scope of the present invention, the preceding description is intended to be limited only by the scope of the claims.

What is claimed is:

1. A method of forming mesoporous inorganic oxide particles in which at least 50% of the particles are spherical, the method comprising the steps of:

a. preparing a reaction mixture capable of forming said mesoporous inorganic oxide particles, said reaction mixture comprising:

i. a mineral acid selected from the group consisting of HCl, HBr and HI;

ii. an inorganic oxide source consisting of a compound having a formula Si(OR1)(OR2)(OR3)(OR4) where Si is silicon, O is oxygen and R1, R2, R3 and R4 are alkyl chains having 1 to 4 carbon atoms;

iii. a surfactant consisting of one or more members of the group consisting of:

(1) a cationic ammonium having a formula R1R2R3R4N+X−, where R1, R2 and R3 are alkyl chains consisting of 1 to 6 carbon atoms, R4 is an alkyl chain consisting of 12 to 24 carbon atoms and X− represents a counterion to said surfactant selected from the group consisting of Cl−, Br−, I− and OH−;

(2) a cationic diammonium having a formula [R1R2R3N+R4N+R5R6R7]X−X−, where R1, R2, R5 and R6 represent alkyl chains consisting of 1 to 6 carbon atoms, R3 represents an alkyl chain of 12 to 24 carbon atoms, R4 represents an alkyl chain of 3 to 16 carbon atoms, R7 represents an alkyl chain of 1 to 24 carbon atoms, and X− represents a counterion to the surfactant which may be Cl−, Br−, I− or OH−; and (3) a tri-block copolymer $EO_xPO_yEO_z$, where EO is polyethylene oxide, PO is polypropylene oxide and x ranges from 5 to 106, y ranges from 30 to 85 and z ranges from 5 to 106;

iv. water;

b. mixing said reaction mixture sufficiently so that mesostructured inorganic oxide particles may be formed as a result of the following step c;

c. heating said reaction mixture at a temperature and for a time sufficient to form mesostructured inorganic oxide particles, at least 50% of which are spherical, wherein said mixing step b and said mixing c are completed in less than 12 hours; and d. removing organic material from said mesostructured inorganic oxide particles so as to form mesoporous inorganic oxide particles.

2. A method according to claim 1, wherein said inorganic oxide source consists essentially of tetraethoxysilane.

3. A method according to claim 1, wherein said cationic ammonium surfactant consists essentially of cetyltrimethylammonium bromide.

4. A method according to claim 1, wherein said triblock copolymer surfactant consists essentially of a tri-block copolymer $EO_{20}PO_{70}EO_{20}$, where EO is polyethylene oxide and PO is polypropylene oxide.

5. A method according to claim 1, wherein said mixing step b is performed by stirring.

6. A method according to claim 1, wherein said mixing step b is performed by sonication.

7. A method according to claim 1 wherein said mixing step b is performed until said reaction mixture is opaque.

8. A method according to claim 1, wherein said mixing step b and said heating step c are completed in less than 2 hours.

9. A method according to claim 1, wherein said reaction mixture in said mixing step b has a temperature in the range 15 to 45° C.

10. A method according to claim 1, wherein said reaction mixture in said mixing step b has a temperature in the range 20 to 25° C.

11. A method according to claim 1, wherein said reaction mixture in said mixing step b has a temperature in the range 30 to 40° C.

12. A method according to claim 1, wherein said heating step c is performed at a temperature in the range 60 to 230° C.

13. A method according to claim 1, wherein said heating step c is performed at a temperature in the range 130 to 190° C.

14. A method according to claim 1, wherein said heating step c is performed for 15 to 80 minutes.

15. A method according to claim 1, wherein said heating step c is performed for about 40 minutes.

16. A method according to claim 1, wherein said removing step d includes heating said reaction mixture at a temperature and time sufficient to burn off organic material such that said mesoporous silica particles have a pore volume in the range 0.35 to 0.75 $centimeter^3$/gram.

17. A method according to claim 1, wherein said reaction mixture additionally comprises a metal salt having the formula $MnXy$, where M is a metal cation, n is 1 or 2, X is an anion selected from the group consisting of chloride, bromide, iodide, acetate, sulfate, nitrate and acetylacetonate and y is 1, 2, 3 or 4.

18. A method according to claim 17, wherein said metal cation M is aluminum.

19. A method according to claim 17, wherein said metal cation is a transition metal.

20. A method according to claim 18, wherein said transition metal is selected from the group consisting of iron, molybdenum, palladium, platinum, ruthenium, titanium, and zirconium.

21. A method according to claim 17, wherein said metal cation is a rare earth metal.

22. A method according to claim 17, wherein said metal cation has the formula Al(OR1)(OR2)(OR3), where Al is aluminum, O is oxygen and R1, R2 and R3 are alkyl chains having 1 to 4 carbon atoms.

* * * * *

UNITED STATES PATENT AND TRADEMARK OFFICE
CERTIFICATE OF CORRECTION

PATENT NO. : 6,334,988 B1
DATED : January 1, 2002
INVENTOR(S) : Gallis et al.

It is certified that error appears in the above-identified patent and that said Letters Patent is hereby corrected as shown below:

Column 15,
Line 10, delete "mixing c" and substitute therefore -- "heating step c" --.
Line 16, delete the word "essentially."

Signed and Sealed this

Twentieth Day of August, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,334,988 B1
DATED : January 1, 2002
INVENTOR(S) : Karl W. Gallis and Christopher C. Landry It is certified that error appears in the above-identified patent and that said Letters Patent is hereby corrected as shown below:

Column 1,
Line 7, please add the following:

-- STATEMENT REGARDING GOVERNMENT SPONSORED RESEARCH OR DEVELOPMENT:

This invention was made with Government support under Grant No. OSR-9350540 awarded by the National Science Foundation, Experimental Program to Stimulate Competitive Research (EPSCoR), Cooperative Agreement; and Grant No.: CHE-9531349 awarded by the Research Experience for Undergraduate (REU) Program sponsored by the National Science Foundation. The Government may have certain rights in this invention. --

Signed and Sealed this

Thirty-first Day of May, 2005

JON W. DUDAS
*Director of the United States Patent and Trademark Office*